(No Model.)
A. I. ANDERSON.
CLEVIS, &c.
No. 506,897.      Patented Oct. 17, 1893.
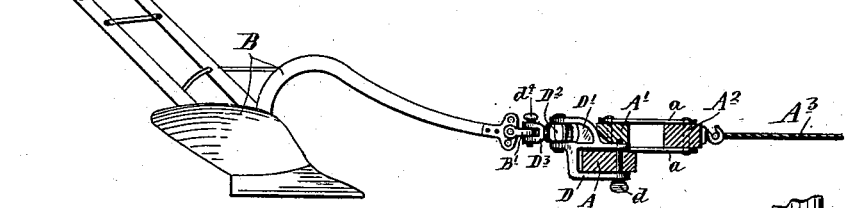
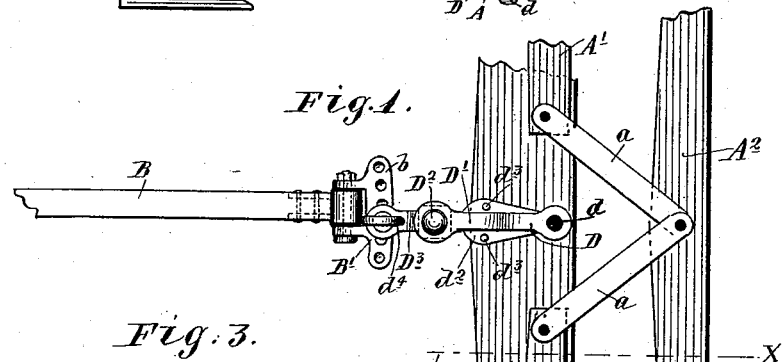
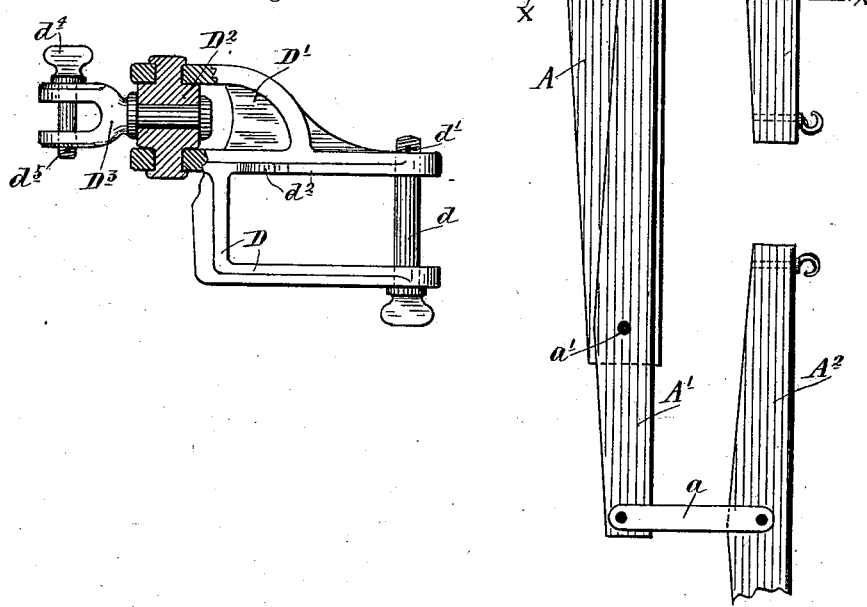
Witnesses.
A. H. Opsahl.
Frank D. Merchant.
Inventor.
Alfred I. Anderson
By his Attorney.
Jas. F. Williamson

UNITED STATES PATENT OFFICE.

ALFRED I. ANDERSON, OF ODELL, NORTH DAKOTA.

CLEVIS, &c.

SPECIFICATION forming part of Letters Patent No. 506,897, dated October 17, 1893.

Application filed July 17, 1893. Serial No. 480,695. (No model.)

*To all whom it may concern:*

Be it known that I, ALFRED I. ANDERSON, a citizen of the United States, residing at Odell, in the county of Barnes and State of North Dakota, have invented certain new and useful Improvements in Clevises for Three and Four Horse Eveners; and I do hereby declare the following to be a full, clear, and exact description of the invention, such as will enable others skilled in the art to which it appertains to make and use the same.

My invention has for its object to provide an improved clevis, especially adapted for use with three and four horse eveners, to bring the double trees and implement connection into the direct line of draft. I also provide an implement connection of improved construction.

To these ends, my invention consists of the novel features and arrangement of parts hereinafter fully described and particularly defined in the claim.

My invention is illustrated in the accompanying drawings, as applied for attaching a three-horse evener to a plow.

Like letters refer to like parts throughout.

Figure 1 is a plan view, with some parts broken away. Fig. 2 is a view partly in side elevation, and partly in cross section, on the line X X' of Fig. 1; and Fig. 3 is a side elevation of the clevis detached, with the pivot block shown in vertical section.

A represents the draw-bar or main beam, A' the double trees or equalizers, and A² the single trees, of an ordinary three-horse evener.

$a$ represent the straps connecting the single trees with the double trees; and $a'$ the pivots connecting the double trees with the main beam or draw-bar A. The double trees A', are offset in the vertical plane, with respect to the main beam or draw-bar A. As shown, the double trees are pivoted directly to the draw-bar. This relation, of the double trees to the main beam or draw-bar of an evener, is desirable on account of the range of motion afforded to the double trees and single trees, without interference with the draw-bar, and on account of compactness of construction. Hitherto, however, with this class of eveners, having vertically offset double trees, no means have been provided for attaching the same to the implement or other object to be dragged, which would throw the double trees and implement connection into the direct line of draft; but, on the contrary, the implement connection has been in the same horizontal plane, with the draw-bar or main beam A. The result of this old construction has been to make the evener work at an angle or dip, either upward or downward, with respect to the implement connection, which fact produced large wear and tear on the pivotal connections, and made it difficult to properly handle the plow or other implement being dragged. These limitations are all overcome by my improvement.

B represents an ordinary plow provided with an ordinary adjustable plow clevis B', adapted to be secured in any desired fixed position, at the end of the plow beam, and provided with the ordinary laterally expanded head $b$, with a series of holes for attaching the evener clevis, at any desired point, in respect to the center of the plow beam.

Turning now to my improved clevis, I construct the same with an evener yoke D, and a head-yoke or plow connection yoke D', offset from each other in the vertical plane with their jaws facing in opposite directions, the bodies of the two yokes being formed integral with each other. The evener yoke D may be connected with the main beam or draw-bar A of the evener, by the ordinary clevis bolt $d$, working through coincident holes in the draw-bar and jaws of the yoke, and securable by a colter $d'$, or otherwise. The jaws of the evener yoke D, are preferably provided with lateral flanges $d^2$, through which may work wood-screws or small side bolts $d^3$, if it should be desired to secure the clevis from pivotal movement on the draw-bar or main beam A.

$D^2$ is a vertical pivot-block pivoted in the jaws of the head-yoke D'.

$D^3$ is a swivel yoke swiveled in the pivot-block $D^2$, and provided with a pin or bolt $d^4$, for attachment to the plow clevis or beam-head B'. The pin $d^4$ is also secured from displacement by a colter $d^5$, or otherwise. With this construction, it is obvious that the pivot block $D^2$, will permit a lateral or horizontal pivotal motion, and that the swivel yoke $D^3$, will permit a vertical pivotal motion of the evener and the plow, or other implement, or object to be dragged, with respect to each other. The said pivot-block and swivel-yoke, therefore, afford a connection, which will give freedom for all the desired angular movements of the evener and plow, with respect to each other.

The offset relation of the evener yoke D, and the head-yoke D', with its co-operating parts D² and D³, compensates for the offset relation of the double trees A', and the main beam or draw-bar A of the evener. Hence, the double trees A' and the plow connections D² D³, will work in a common plane, in the direct line of draft, as clearly appears in Fig. 2 of the drawings. This relieves the plow, or other implement from any dipping strain, either downward or upward, and enables the plow to be much more easily handled by the plowman. The angular strain on the evener pivots, is also removed, as hitherto noted. It also gives a regular, and hence a less wearing draft on the draft animals. If it be desired to throw the line of draft to a lower level, it is of course, obvious, that both the evener clevis and the evener might be turned over, so as to work upside down, exactly in the reverse position, from that shown in the drawings. The principle of bringing the implement connection and the double trees into a common and direct line of draft, would remain just the same.

In Fig. 2, A³ represents one of the traces or tugs, for attaching the draft animals, shown as drawn taut to exhibit the line of draft.

What I claim, and desire to secure by Letters Patent of the United States, is as follows:

The combination with the evener A A' A², as described, of the evener clevis consisting of the evener yoke D, having the pin $d$, for attaching the evener, and the head-yoke D' offset from and formed integral with the yoke D and having the pivot-block D², carrying the swivel-yoke D³ with pin $d^4$, for attachment to the plow or other object, substantially as described.

In testimony whereof I affix my signature in presence of two witnesses.

ALFRED I. ANDERSON.

Witnesses:
JAS. F. WILLIAMSON,
E. F. ELMORE.